P. Shaw,

Air Engine.

No. 1,014. Reissued July 17, 1860.

Witnesses.

Geo. R. Roach.

J. B. Schumacher

Inventor.

Philander Shaw

UNITED STATES PATENT OFFICE.

PHILANDER SHAW, OF BOSTON, MASSACHUSETTS.

IMPROVEMENT IN AIR-ENGINES.

Specification forming part of Letters Patent No. 10,868, dated May 2, 1854; Reissue No. 1,014, dated July 17, 1860.

*To all whom it may concern:*

Be it known that I, PHILANDER SHAW, of Boston, formerly of East Abington, in the county of Plymouth and State of Massachusetts, have invented certain Improvements in Hot-Air Engines, of which the following is a full, clear, and exact description, reference being had to the annexed drawings, making part of this specification, in which—

Figure 1:
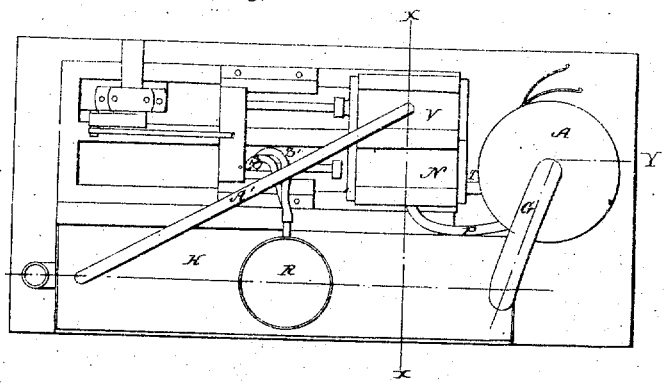
Figure 2:
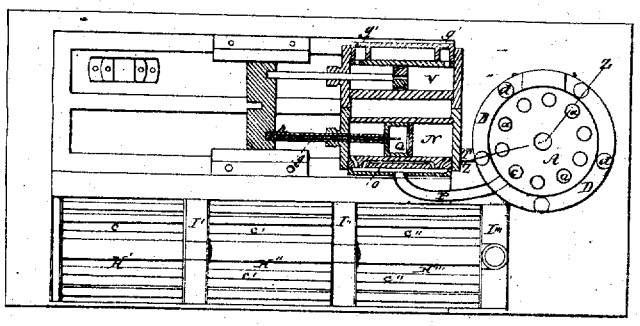
Figure 4:
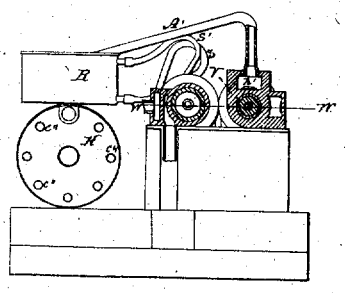
Figure 3:
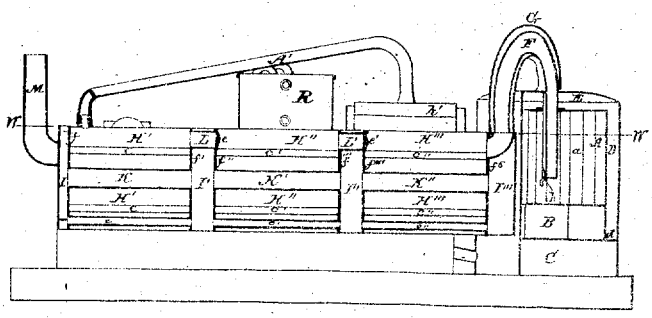
Figure 5:
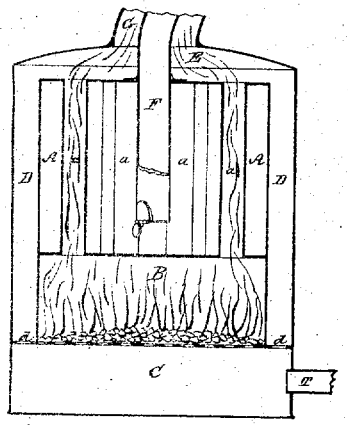

Figure 1 is a plan of the engine; Fig. 2, a section on the line W W of Figs. 3 and 4, the shell of the auxiliary heater being removed to show the parts within; Fig. 3, a section on the line Y Y of Fig. 1; Fig. 4, a section on X X of Fig. 1; Fig. 5, an enlarged section of the main heater on Z Z of Fig. 2.

The nature of my invention consists, first, in the employment of auxiliary heaters, which are so connected together and with each other by means of valves that the air for the supply of the engine shall be pumped in against the minimum pressure within the main heater, while it is worked off at the maximum pressure.

My invention also consists in passing the exhaust air from the cylinder together with the smoke and heated gases from the furnace through the auxiliary heaters in one direction, while the air for the supply of the engine is caused to pass in the contrary direction through tubes within these auxiliary heaters, by which means the heat is extracted from the exhaust air and smoke and transferred to the air on its way from the air-pump to the heater; and my invention also consists in passing the air which propels the piston directly through the fire for the purpose of economizing heat, as will now be more fully described.

Great inconvenience has heretofore been experienced in the working of hot-air engines from the difficulty of obtaining a packing that will resist the great temperature to which the piston is liable to be raised. To remedy this inconvenience I have adopted the plan of refrigerating the piston by means of a constant stream of cold water, which is made to circulate through its interior, and thus preserve it at a temperature not exceeding that of boiling water.

To enable others skilled in the art to make and use my invention, I will proceed to describe the method which I have adopted of carrying it out, describing first my separate improvements, and finally the general operation of the complete engine.

A is the main heater, into which the air is received from the auxiliary heaters, and in which it receives a final heating preparatory to being admitted to the working-cylinder. B is the fire-box; C, the ash-pit of the furnace beneath the heater A. *a* are vertical tubes which pass entirely through the heater, and through which the smoke and burning gases from the furnace pass. D is a chamber which entirely surrounds the heater and fire-box, and which opens at the top into the chimney or smoke-box E, and communicates with the chamber beneath the furnace through the openings *d* in its bottom plate, the object of which will be explained hereinafter. F is an air-pipe of communication between the auxiliary and the main heaters, which is entirely surrounded by the smoke-flue G, and is furnished with a valve, *b*, opening downward at its lower extremity. H is the auxiliary heater, which is divided into three sections or minor heaters, H′ H″ H‴. These sections are separated from each other and from the ends of the heater by chambers I I′ I″ I‴, formed by close-fitting partitions, *f f′ f″ f‴ f⁗ f⁵*, the chambers I I′ I² I³ communicating with each other through the tubes *c c′ c″* K K′ K″.

The smoke from the furnace enters through the pipe G into the chamber I‴; thence it passes through the tubes *c″* K″ into the chamber I″; thence through the tubes K′ *c′* into the chamber I′; thence through the tubes K *c* into the chamber I, whence it passes off by the chimney M.

By the arrangement above explained it will be perceived that the compartments H′ H² H³ are entirely shut off from the chambers I I′ I″ I⁗ and from the smoke-flues *c* and K, which pass through them. They, however, communicate with each other through the short tubes L L. These tubes are fitted at their advance ends with valves *e e′*. The air from the force-pump is admitted into these compartments in succession, passing through the tubes L and L′ and the valves *e e′*, in a manner which will be hereinafter more fully described.

N is the working cylinder; *o*, the hot-air box which communicates with the heater A, through the pipe P. Q is the hollow piston, the piston-rod of which is also hollow, as seen in Fig. 2. *g* is a tube inclosed within the hollow piston-rod, and penetrating it at about the point *h*. R is a receptacle for water. S S′ are india-rubber tubes from the top and bottom of this receptacle, which communicate one with the interior of the hollow piston and the other with the small tube inclosed therein. By this means the water from the receptacle R is caused to circulate continually through the hollow piston, which is thus prevented from becoming injuriously heated, as before mentioned.

T is the discharge-pipe from the working-cylinder, which is made to enter the ash-pit C immediately beneath the grate-bars. All the advantages resulting from urging the fire with heated air are thus obtained. The excess of the exhaust-air not required by the fire passes through the openings *d* into the chamber D, which incases the furnace, and off with the heated gases, and the products of combustion through the flue G into the chamber $I^3$, whence they pass out in the manner already described. By thus passing the exhaust-air into the chamber D, I am enabled to economize the heat which would otherwise be radiated from the outside of the furnace.

The object of thus exhausting the hot air from the cylinder into the ash-pit beneath the furnace is two-fold: first, the fire is urged with heated air; secondly, such portion of the exhaust air as is not thus consumed passes with the products of the furnace into the auxiliary heaters, where it is refrigerated by the fresh air entering from the force-pump, in a manner that will be presently explained.

V is the force-pump for supplying the heater with air, the area of its piston being about one-half that of the working-piston. Air is admitted to this pump through the valves *g″* and escapes through valves in the top of the cylinder into the chamber *h′*; thence it passes by the pipe A′ into the compartment H′ of the auxiliary heater. Here it circulates round the outside of the smoke passages and tubes, *c* K, and passes (when the pressure is removed from the main heater, in the manner which will be hereinafter explained) through the short communication-pipes L and valves *l* into the compartment H″. Here it again circulates round the smoke-pipes *c′* K′ and through the pipe L′ and valve *e′* into the compartment H‴. From this compartment it passes through the pipe F and valve *b* into the heater A.

It is evident that the auxiliary heater may consist of one or more compartments, there being always a valve-communication between the last of such compartments and the main heater.

Operation: The air within the main heater A, as it expands, closes the valve *b*, which thus prevents it from returning through the pipe F into the auxiliary heater H. A charge is then admitted to the working-cylinder, the capacity of the heater A being such with relation to the working-cylinder that when cut off at three-fourths stroke, or thereabout, the pressure within the heater A shall be very much reduced. The valves *b e′ e* then open, or as soon as the pressure in the compartments is reduced below what it is in the one behind it, and the pressure for an instant is the same in all the compartments. The expansion caused by the extreme heat within the heater A soon closes the valve *b*, the valves *e′ e* being in like manner closed, as the heat within the compartment H‴ is greater than that within H″, and so on, it being nearer to the furnace. The pressure within H′ thus always remains at very near the minimum, and as the air is pumped into this compartment it is evident that it is only resisted by this minimum pressure, while it is worked off from the main heater A at its maximum pressure.

The exhaust-air from the cylinder, as before stated, enters the close ash-pit C, and the fire is thus urged by a hot blast. That portion of the exhaust-air not required by the fire passes off with the products of combustion, and is refrigerated in the auxiliary heater H by the entering air. The exhaust-air may be made to enter the auxiliary heater with the smoke from the furnace, and thus a portion of the advantages above described will be secured; but I prefer the exhaust beneath the fire, for the reasons already set forth.

Several heaters and auxiliary heaters may be adapted to a single engine, a charge of air being taken from each in succession.

What I claim as my invention, and desire to secure by Letters Patent, is—

1. The within-described auxiliary heater, constructed and arranged as set forth, the exhaust-air and the products of combustion being passed through in one direction, while the cold air from the force-pump is passed through in the other, by which means the heat is extracted from the heated air and smoke, and transferred to the cold air on its way to the engine, the latter being pumped in against a pressure much less than that at which it is worked off from the main heater, as explained.

2. I do not claim the use of cold water for the purpose of refrigerating the cylinder or piston of hot-air or other engines; but what I do claim is the arrangement herein described of the tubes within the piston-rod, the reservoir R, and the india-rubber tubes S S′, for the purpose set forth.

3. Passing the exhaust-air which has propelled the piston directly through the fire for the purpose of economizing heat, as set forth.

PHILANDER SHAW.

Witnesses:
THO. R. ROACH,
P. E. TESCHEMACHER.